United States Patent [19]

Polansky

[11] Patent Number: 4,589,586
[45] Date of Patent: May 20, 1986

[54] COLLET FOR DIE BONDING
[75] Inventor: Carl Polansky, Landisville, Pa.
[73] Assignee: RCA Corporation, Princeton, N.J.
[21] Appl. No.: 770,568
[22] Filed: Aug. 29, 1985
[51] Int. Cl.⁴ .............................................. B23K 31/02
[52] U.S. Cl. .................... 228/179; 228/44.7; 228/6.2; 279/3
[58] Field of Search .................. 228/44.7, 179, 6.2; 279/3

[56] References Cited

U.S. PATENT DOCUMENTS

| 3,451,607 | 6/1969 | Miller et al. | 228/1 |
| 3,676,911 | 7/1972 | Austin | 222/44.7 |
| 3,695,501 | 10/1972 | Radobenko | 228/44.7 |
| 3,698,618 | 10/1972 | Helda | 228/44.7 |
| 3,921,884 | 11/1975 | McDonough et al. | 228/44.7 |

OTHER PUBLICATIONS

Kulicke and Soffa Industries, "Bonding Tools and Production Accessories".

Primary Examiner—Nicholas P. Godici
Assistant Examiner—Karen Skillman
Attorney, Agent, or Firm—Birgit E. Morris; Edward J. Sites

[57] ABSTRACT

A collet is described for use in die bonding of semiconductor dies which is comprised of a shank portion and a die holder portion which has triangular side walls and is open ended.

5 Claims, 6 Drawing Figures

COLLET FOR DIE BONDING

This invention relates to a novel collet for use in die bonding a semiconductor die to a surface of a mounting member. More particularly, this invention is concerned with a collet which is especially useful for die bonding a fragile laser diode to a heat sink or the like.

BACKGROUND OF THE INVENTION

In the assembly of electronic apparatus it is common practice to employ semiconductor devices which are manufactured in the form of a die and then bonded in position during the manufacture of the electronic apparatus. The semiconductor dies are manufactured by depositing, on a wafer of a material such as silicon dioxide or gallium arsenide, a plurality of different layers of conductive, semiconductive and dielectric materials in precisely defined configurations. When the wafers are completed they are diced into individual dies, which are often very delicate. The individual semiconductor dies are difficult to handle during assembly of electronic apparatus because of their relatively small size and because certain types of semiconductor dies, such as laser diodes, are extremely fragile and thus easily damaged.

Most of the methods which have heretofore been employed to bond the semiconductor dies in position during the manufacture of electronic devices, such as compression die bonding and the like, have proven to be unsatisfactory. Excellent bonding of semiconductor dies can, however, be achieved by a process in which the semiconductor die is joined directly to a mounting surface which has been pre-treated with a material which forms a eutectic bond in situ with the semiconductor die. The die bonding process which is employed includes a combination of heat, pressure and a controlled amount of mechanical agitation, commonly called "scrubbing." The above-noted combination of process steps initiates and promotes satisfactory formation of in situ formed eutectic bonds. Die bonders are commercially available from various sources, such as Kulicke and Soffa Industries, which incorporate features which will provide controlled application of heat and pressure in combination with various selected types of scrubbing action during the die bonding process. The commercially available die bonders are designed for use with a variety of different types of collets to pick up and hold different sizes, shapes and types of semiconductor dies during die bonding. The collets are secured in a chuck or the like of a control arm or similar device of the die bonder. The collets typically include a vacuum conduit which is operationally connected to the die bonder to provide a vacuum for picking up and holding individual semiconductor dies during die bonding.

The commercially available die bonders are generally satisfactory for most applications. It has been found, however, that the collets which are available for use with the die bonder are often unsatisfactory. The most common type of collets has a four-sided configuration with an internal pyramidal-shaped pocket for holding a semiconductor die during die bonding. In the assembly of laser emitters and laser detectors it is critical for proper operation of the final device that the leading edge of the active area of the laser diode be precisely positioned at the edge of the supporting member to which it is to be bonded in order to have proper operation of the device. Using the commonly available four-sided collets it is not possible to observe the leading edge of the laser diode during die bonding for purposes of aligning the leading edge or the laser diode with the edge of the supporting member. Furthermore, the collets heretofore available tend to apply excessive pressure at the edges of the laser diodes, and to the highly fragile active regions of the laser diodes which causes the laser diodes to fracture during die bonding.

What would be highly desirable would be a collet for a die bonder apparatus which would permit more accurate placement of semiconductor dies and would also reduce the amount of damage during die bonding of the semiconductor die to a support member.

SUMMARY OF THE INVENTION

A novel collet is disclosed which has triangular-shaped walls and is open ended.

DETAILED DESCRIPTION OF THE INVENTION

Figure 1:
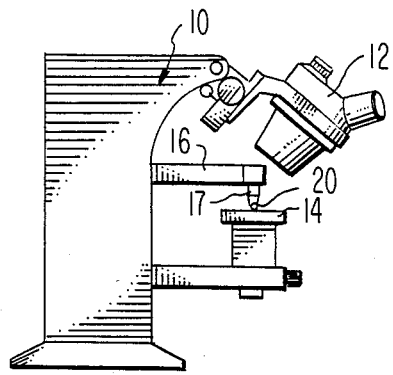
FIG. 1 is a pictorial illustration of a typical commercially available die bonder.
Figure 2:
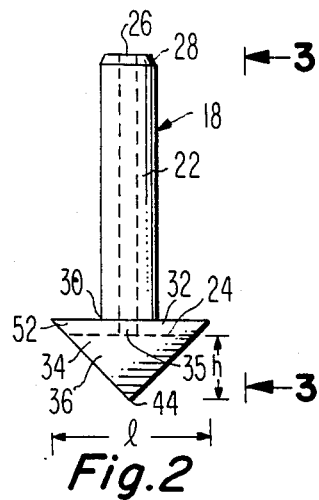
FIG. 2 is a side view of the collet of this invention.
Figure 3:
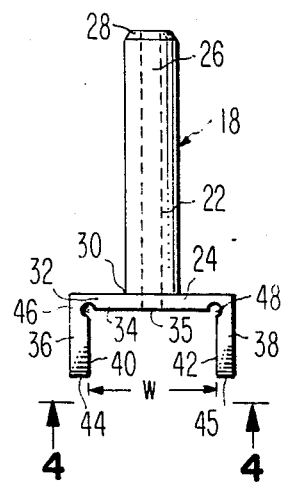
FIG. 3 is a front view of the collet of this invention taken as indicated by the lines and arrows 3—3 on FIG. 2.
Figure 4:
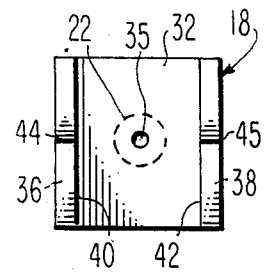
FIG. 4 is a bottom view of the collet of this invention taken as indicated by the lines and arrows 4—4 on FIG. 3.

In FIG. 1 there is illustrated a conventional die bonder 10. The die bonder 10 includes a microscope 12, an adjustable work platform 14, and a control arm 16 for controlling the application of heat and pressure during die bonding and for imparting a predetermined pattern of oscillation. A collet 17 is secured at the end of the control arm 16 which is designed to hold a semiconductor die (not shown) in position for die bonding to the mounting member 20 positioned on the adjustable work platform 14.

The collet 18 of this invention is an integral unit made from a metal such as stainless steel. The collet 18 has a shank portion 22 and a die holder portion 24.

The shank portion 22 is shaped and adapted for cooperative engagement with the control arm 16 of the die bonder 10. The shank portion 22 is somewhat elongated and has a conduit 26 extending from the first terminal end 28 to the second terminal end 30 of the shank portion 22. In use, the conduit 26 is employed for supplying a vacuum to the die holder portion 24.

The die holder portion 24 is formed at the second terminal end 30 of the shank portion 22 of the collet 18. The die holder portion 24 has an upper wall 32 having a flat smooth inner surface 34 and an aperture 35 formed through the upper wall 32 which is in communication with the conduit 26 of the shank portion 22. A pair of spaced-apart triangular-shaped walls 36, 38 having flat smooth inner surfaces 40, 42 extend perpendicularly from the upper wall 32 with the respective apexes 44, 45 of the triangular-shaped walls 36, 38 extending away from the upper wall 32. The inner surface 34 of the upper wall 32 and the inner surfaces 40, 42 of the triangular-shaped walls 36, 38 define a receptacle for receiving a semiconductor die having a parallelepiped configuration. Reliefs 46, 48 are preferably formed at the intersections of the upper wall 32 and triangular-shaped side walls 36, 38 in the interior of the collet 18 to prevent pressure being applied to the corners of a semiconductor die held within the collet 18.

The width w of the collet 18 between the inner surfaces 40, 42 of the triangular-shaped walls 36, 38 is chosen to be slightly wider than that of a semiconductor die to be held by the collet 18, so that it forms a snug fit but is not so tight that it applies force to a semiconductor die positioned within the collet 18. The length 1 of the die holder portion 24 is chosen so that it is significantly less than the total length of a semiconductor die to be held by the collet 18. The ends of the semiconductor die are thus exposed so as to facilitate the accurate placement of the semiconductor die on the mounting member 20 and also to substantially reduce the total contact area of the collet 18 with the semiconductor die, thereby reducing breakage of the semiconductor die.

The height h of the triangular-shaped walls 36, 38 from the inner surface 34 of the upper wall 32 to the apexes 44, 45 of the triangular-shaped side wall portions 36, 38 is chosen to be less than the height of the semiconductor die with which the collet 18 will be employed. When die bonding laser diodes 52 to a mounting member 20, it is highly advantageous that the height h be significantly less than the total height of the semiconductor die, as will be explained in greater detail below.

In use the collet 18 is connected to the control arm 16 of the die bonder 10. A vacuum is applied through the conduit 26. A semiconductor die is picked up and positioned by the collet 18 on the mounting member 20 positioned on the work platform 14.

Figure 5:
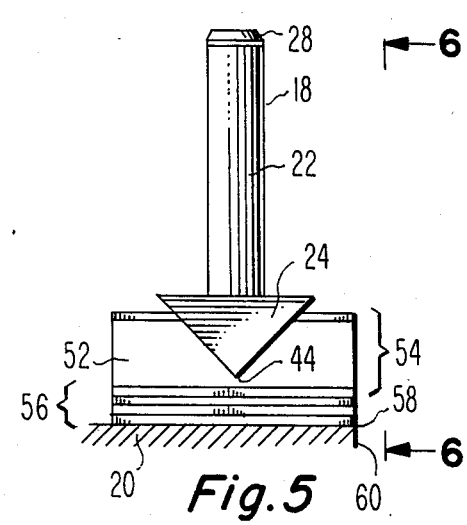
FIG. 5 is a side view of the collet of this invention having a laser diode semiconductor die positioned within said collet.
Figure 6:
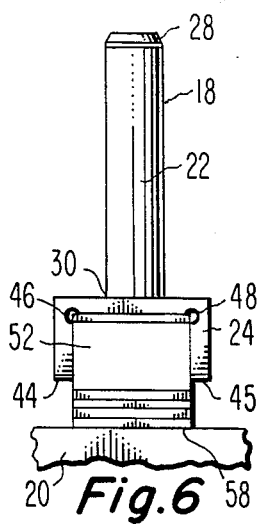
FIG. 6 is a front view of the collet of this invention having a laser diode semiconductor die positioned with said collet taken as indicated by the lines and arrows 6—6 on FIG. 5.

The relationship of the collet 18 to the laser diode semiconductor die 52 is illustrated in FIGS. 5 and 6. A laser diode semiconductor die 52 is positioned within the collet 18. The laser diode 52 which is shown in FIGS. 5 and 6 is made of a plurality of layers which form a support zone 54 and an active zone 56 of the laser diode 52. The support zone 54 is relatively strong and is therefore not easily damaged during die bonding. The active zone 56, however, is extremely brittle and can be damaged easily during die bonding. Furthermore, it is extremely important that the leading edge 58 of the laser diode 52 be precisely aligned with the face 60 of the mounting member 20.

As shown in FIGS. 5 and 6, the triangular-shaped side walls 36, 38 contact only the stronger support zone 54 of the laser diode 52 and the contact area is decreased gradually to the apexes 44, 45 of the triangular-shaped side walls 36, 38, substantially reducing possibility of damage to the active zone 56. Furthermore, because the leading edge 58 of the laser diode 52 extends past the end of the collet 18 and is fully exposed, it can be accurately aligned with the leading edge 60 of the mounting member 20 during die bonding.

The collet 18 of this invention results in substantial reduction in damage to semiconductor dies, especially laser diodes during die bonding and also provides a means of substantially improving the accuracy of the placement of the semiconductor dies on the mounting member.

What is claimed is:

1. A collet for simultaneously holding and oscillating a semiconductor die on the surface of a mounting member during die bonding;

said collet being an integral member comprised of a shank portion and a die holder portion;

said shank portion being adapted for cooperative engagement with a die bonder and having first and second terminal ends with a vacuum conduit means extending from the first terminal end to the second terminal end;

said die holder portion being formed at the second terminal end of the shank portion and consisting of an upper wall having a flat inner surface and an aperture defined therein in communication with the vacuum conduit means;

said die holder portion further consisting of a pair of opposing spaced-apart triangular-shaped walls having flat inner surfaces and extending perpendicularly from the upper wall with the respective apexes of the triangular-shaped walls extending away from the upper wall, and said inner surfaces of said walls in combination defining an open ended internal receptacle for receiving said semiconductor die.

2. The collet according to claim 1 wherein the intersection of the inner surfaces of the walls are relieved.

3. The collet according to claim 1 wherein said semiconductor die has a predetermined length and said die holder portion has a length which is the same or less than that of the semiconductor die.

4. The collet according to claim 1 which when used in bonding a laser diode semiconductor die wherein the diode has a relatively strong support layer overlying a relatively brittle active layer, the triangular-shaped walls extend from the surface of the upper wall a given distance which is insufficient to contact the active layer of the laser diode semiconductor die.

5. An apparatus for die bonding a semiconductor die to a mounting surface, comprised of a die bonder and a collet according to claim 1 with said collet being in operative engagement with said die bonder.

* * * * *